(12) United States Patent
Kuo

(10) Patent No.: US 7,741,974 B1
(45) Date of Patent: Jun. 22, 2010

(54) USB PORT CONNECTIBLE DEVICE REMINDER

(76) Inventor: Chih-Cheng Kuo, 6203 Inway Dr., Spring, TX (US) 77389

( * ) Notice: Subject to any disclaimer, the term of this patent is extended or adjusted under 35 U.S.C. 154(b) by 0 days.

(21) Appl. No.: 12/647,563

(22) Filed: Dec. 28, 2009

Related U.S. Application Data

(60) Provisional application No. 61/272,214, filed on Sep. 1, 2009.

(51) Int. Cl.
 *G08B 1/08* (2006.01)
 *G08B 21/00* (2006.01)
(52) U.S. Cl. ............... 340/686.6; 340/686.1; 340/539.1; 340/539.11
(58) Field of Classification Search .............. 340/686.6, 340/686.1, 539.1, 539.11
See application file for complete search history.

(56) References Cited

U.S. PATENT DOCUMENTS

| | | | | |
|---|---|---|---|---|
| 6,011,471 | A * | 1/2000 | Huang | 340/568.1 |
| 6,459,374 | B1 * | 10/2002 | Rand et al. | 340/568.2 |
| 6,844,816 | B1 * | 1/2005 | Melton et al. | 340/572.1 |
| 7,026,933 | B2 * | 4/2006 | Kim | 340/568.1 |
| 7,362,227 | B2 * | 4/2008 | Kim | 340/571 |
| 2005/0033546 | A1 * | 2/2005 | Hamaguchi et al. | 702/141 |
| 2009/0015418 | A1 * | 1/2009 | Koike | 340/636.1 |
| 2009/0040053 | A1 * | 2/2009 | White | 340/573.4 |
| 2009/0182931 | A1 * | 7/2009 | Gill et al. | 711/103 |
| 2009/0207013 | A1 * | 8/2009 | Ayed | 340/539.1 |
| 2010/0022217 | A1 * | 1/2010 | Ketari | 455/411 |

FOREIGN PATENT DOCUMENTS

| CN | 101188035 | * | 5/2008 |
|---|---|---|---|
| CN | 201191407 | * | 2/2009 |

* cited by examiner

*Primary Examiner*—Benjamin C. Lee
*Assistant Examiner*—Andrew Bee
(74) *Attorney, Agent, or Firm*—Peter Gibson

(57) ABSTRACT

Reminding of the owner of a Universal Serial Bus (USB) port connectible device that the same has been left connected to a USB port of a powered computer is provided by an alarm disposed on a portable base for the device activated by cessation of reception of a limited range radio frequency (RF) signal. Transmission is powered by the computer through the USB port. The portable base has an independent power source for reception/alarm circuitry preferably switched on by separation of a USB port connectible device and/or signalling attachment from the portable base and switched off by physical reunion of the same. Alarm activation while retrieving the USB port connectible device from the USB port of a computer is avoided with an alarm activation delay exceeding in duration a transmission interval minimizing the likelihood of RF signal interference between multiple proximate reminders or other signals of the same RF. An identification (ID) number carried by the RF signal and recognized by a portable base thereby associated with a particular USB port connectible device and/or signalling attachment avoids defeat of alarm activation by reception of another signal of the same RF.

7 Claims, 4 Drawing Sheets

FIGURE 2  PRIOR ART
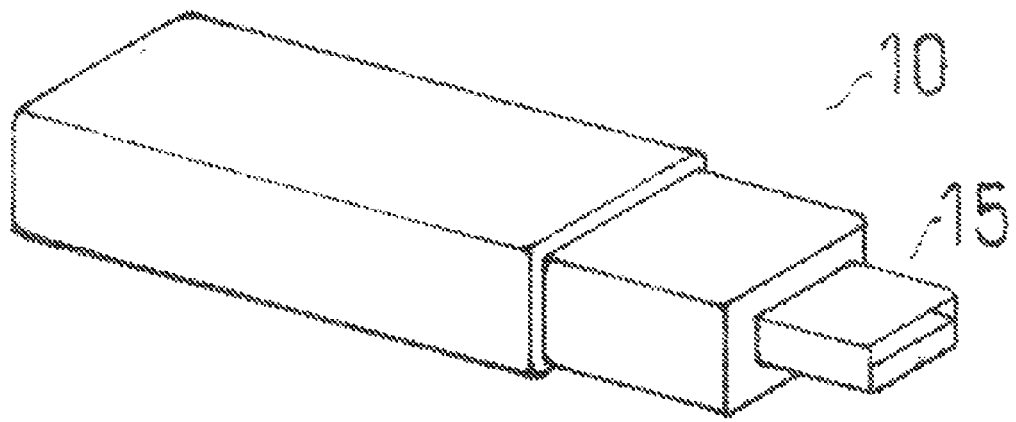
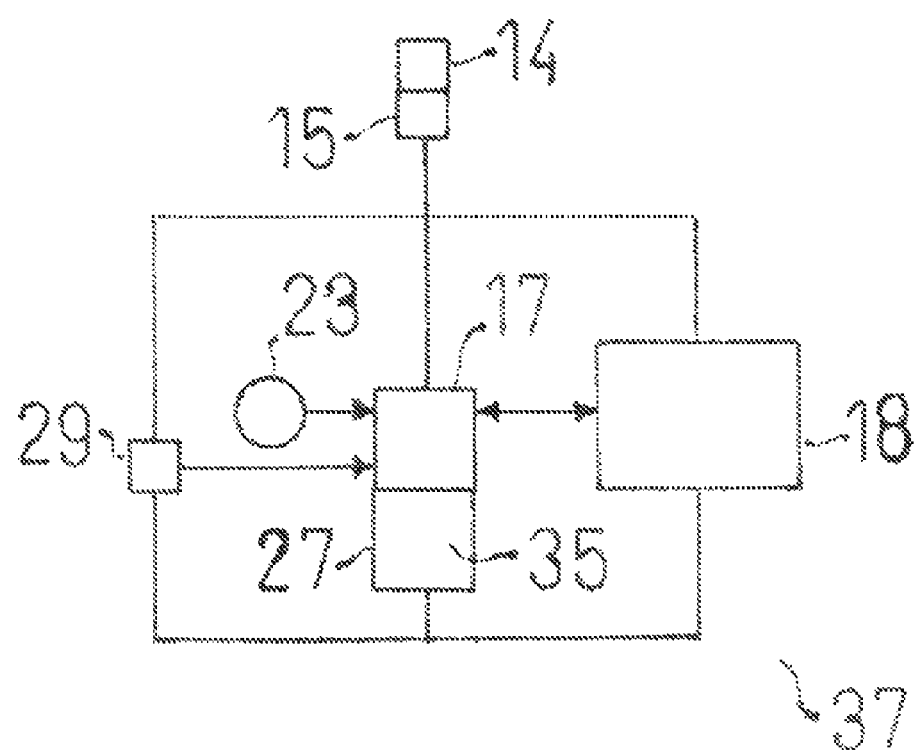
FIGURE 3

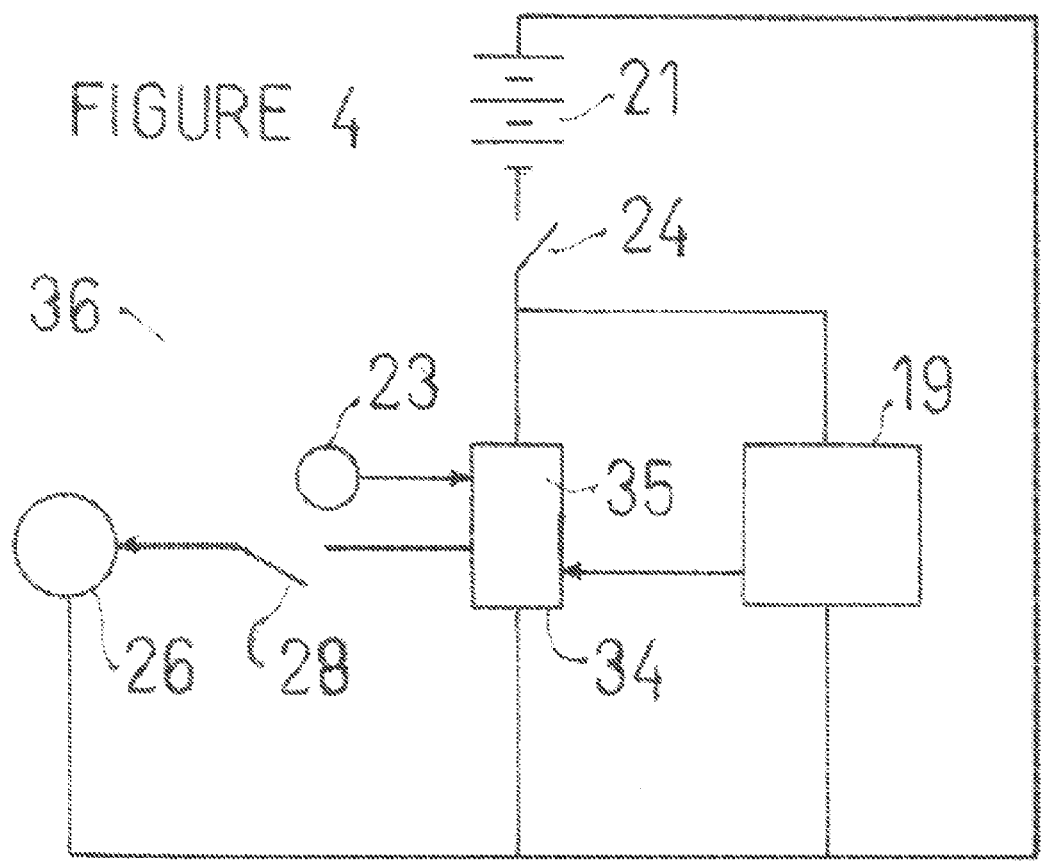

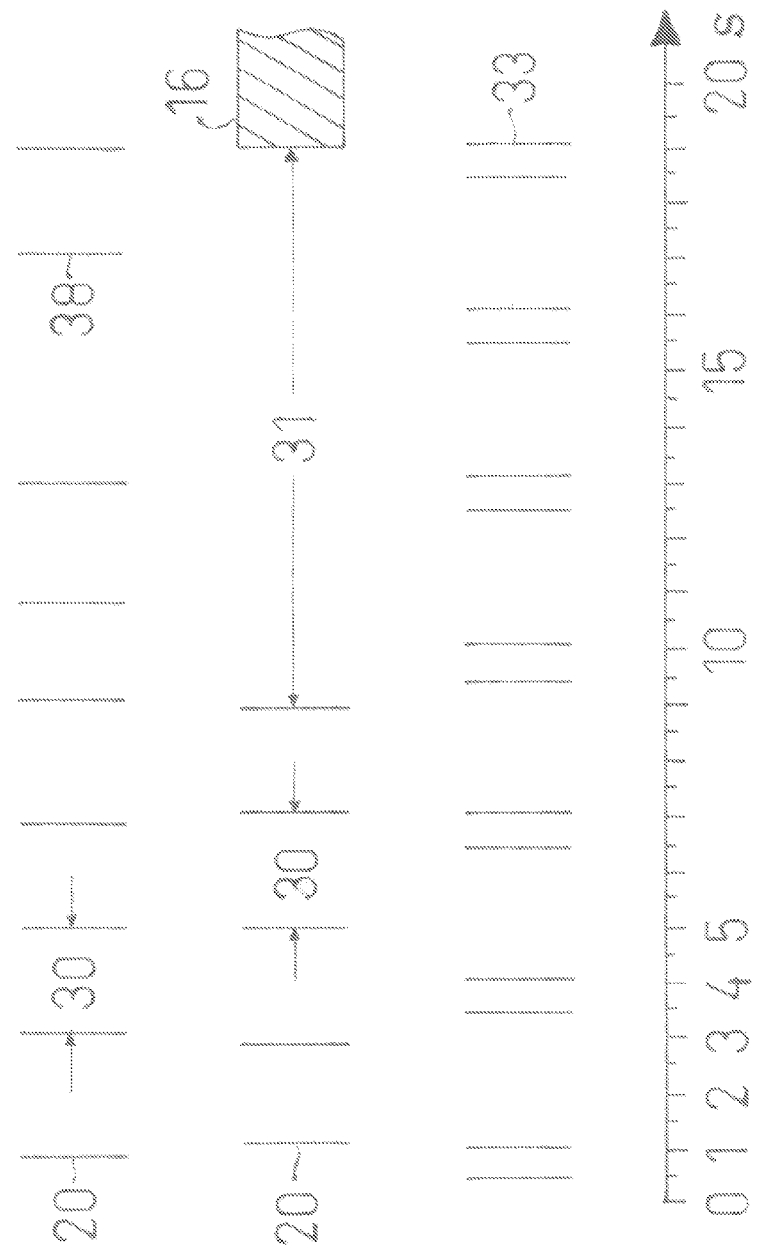

US 7,741,974 B1

USB PORT CONNECTIBLE DEVICE REMINDER

BENEFIT OF EARLIER FILING DATE

This application claims benefit of the earlier filing date of Provisional Application No. 61/272,214: 'USB Port Connectible Device Reminder'; filed Sep. 1, 2009 in the name of the present inventor and Applicant: Chih-Cheng Kuo.

BACKGROUND OF THE INVENTION

1. Field of the Invention

The present invention relates to condition responsive indicating systems (340/500) with particular coupling link (340/531) including personal portable device (340/539.11) wherein said condition relates to article placement or removal (340/568.1) and said particular coupling link comprises radio (340/539.1).

2. General Background

Universal serial bus (USB) port connectible devices: functionally connectible through a USB port to a personal computer (PC) from and through which direct current (DC), typically 5 volt (5V), power is derived and operation enabled; are widely used and encompass many devices including 'flash' and hard disk memory 'drives' as well as USB interfaced devices including wireless, typically infrared (IR) as opposed to radio frequency (RF), adapters for keyboards and 'mice': i.e. input and cursor control devices.

Although USB port connectible devices were practically unknown ten years ago the superiority of serial, as opposed to parallel, buses in data transmission combined with a robust physical configuration easily connected and disconnected without damage to the electrical contacts has achieved nearly universal usage of USB ports on PCs and hence a proliferation of compatible devices.

USB port connectible devices have a connector that is nominally male in being insertable into a USB port but the electrical contacts are not comprised of pins, nor has the port sockets, each having, instead, a row of copper blades biased against each other in connection with the proper sense of the connection ensured by adjacent empty and solid longitudinal halves of a generally rectangular configuration defined by a stamped and formed metal extension on the USB port connectible device.

While USB memory drive replacement cost is typically under $50 the data stored thereon may be very valuable. Doctors, attorneys, engineers, accountants and other professionals: i.e. people holding a form of professional registration and legally responsible for competent performance of their work; must often insert a USB port connectible device, typically a memory drive, into a computer previously unknown to them at a site also unfamiliar to them. Journalists, authors, lobbyists, and other propagandists protected by the First Amendment also may inadvertently leave a USB port connectible memory drive behind functionally connected to a USB port of a computer that is not within their residence, office, or other area within their realm of control that contains extremely sensitive, if not legally liable, data thereon.

As the USB ports are found on the back of 'tower' configuration PCs typically found in workplaces, located on a visually obscure computer back panel, it is not difficult for even an extremely intelligent business executive, much less an absent minded technical type, to forget their USB port connectible device functionally connected to this type of computer or even a 'laptop' style PC where the USB port is typically on a side of the same. The owner of the USB connectible device furthermore may not, owing to a multitude of reasons including the number of PCs and sites visited on a given day, remember which PC or site the USB connectible device was most likely left.

Even if both the site and the particular PC to which the USB port connectible device was left functionally connected are recalled precisely it is not beyond possibility that a competitor or other comparatively unsympathetic person at that site might fail to admit of finding this particular item. It is also considered that at any public site such as an Internet 'cafe' an employee might regard the USB port connectible device left behind as a gift which would be ungracious to acknowledge even if this employee did, by some remote chance, associate the particular device left behind with its owner.

There are, in brief, a multitude of circumstances especially in today's extremely busy and ethically complex society, that could easily occasion failure to return an inadvertently left behind USB port connectible device including a memory drive possessing data valuable to the owner, even if to no one else, in addition to wholly understandable inability of the owner to recall where this device may have been left functionally connected to a PC particularly if that PC is routinely left 'on' or powered as is a commonplace in many workplaces and other sites private, public or non-profit.

3. Discussion of the Prior Art

Tracking location of a person or other moving object generally requires 'plural distinct sensors' (340/539.22) and is hence beyond the scope of the pertinent prior art which, while also responsive to a particular condition and using a particular coupling link (340/531), is not concerned with tracking and does not use plural distinct sensors. 'Having a particular safety function' (340/532) is extraneous to and excluded from the presently pertinent prior art because safety is not involved. The particular condition responded to with a wireless electrical communication link characterizing the pertinent prior art comprises 'article placement or removal' (340/568.1) but not with a detectable device disposed on the protected article for which reason subclasses 572.1 and 572.8: 'Specified device housing or attachment means'; are also both beyond the scope of the pertinent prior art as subclass 572.8 is subordinate to subclass 572.1: "Detectable device on protected article (e.g. 'tag')" which is emphatically not the case with the present invention; and hence devices using radio frequency identification (RFIDs) are wholly excluded from the presently pertinent prior art as is subclass 539.23: "Proximity"; as the same is subordinate to subclass 539.22: "Having plural distinct sensors"; because the present invention does not use plural sensors.

The present invention uses a radio frequency signal and an alarm to assist in reminding the owner of a USB port connectible device that the same has been left functionally connected to a PC. Since no prior art using radio frequency and an alarm is known to be specifically concerned with a USB port connectible device: i.e. 'USB device' as such are commonly known; the closest prior art is considered to use radio frequency and an alarm and to be concerned with a PC or peripheral device or concerned peripherally with a USB device and using radio frequency and an alarm or to be concerned primarily with a USB device and using an alarm or radio frequency.

U.S. Pat. No. 6,011,471 for an 'Alarm system' intended to protect a computer or other electronic device having a slot for a diskette discloses a radio receiver with decoder insertable into a disc drive "slot" with alarm activated as a result of "the code signal from the radio transmitter unit" ceasing which unit also has an on/off switch while "the receiver includes a security switch controlled to turn on/off the radio receiver unit when inserting/removing from the slot of the electronic apparatus." (Abstract)

U.S. Pat. No. 6,459,374 for an 'Anti-Theft Computer Security System', discloses "a USB connector" with a cable extending "through the housing section" "connected to a central alarm monitoring unit" intended to protect a computer. An "alarm sounds" if "the USB connector is disconnected from the computer . . . or if the cable is cut" (Abstract).

2007CN-10186141 can "monitor an article during sports": using a ZigBee transceiver which, as receiver (22) receives a data signal and transmits to a microprocessor with "buzzer (23)". A "shell (11) is mounted" with an USB interface. (Abstract)

U.S. Pat. No. 7,026,933 B2 discloses "a USB device capable of connecting to a USB port of a computer and an alarm sub-system to cause an audible alarm to be generated based on a signal generated within the USB device." (Abstract)

U.S. Pat. No. 7,362,227 B2 discloses an 'Anti-theft and security system for computers' which "includes a control device capable of connecting to an external port of the portable computer. The control device includes a wireless receiver" and is "capable of enabling and disabling a security function executed by the computer based on a wireless signal received by the wireless receiver." (Abstract)

US 2009/0015418 A1 discloses "an electronic device having a detachable part and a main unit with a communicating section. In order to prevent the electronic device from being left, (it includes) a sensor detecting a detached state of the part; a first timer measuring time" part is detached "from the main unit"; "and a warning section issues a warning . . . if the first timer detects the passage of a first time period." (Abstract)

CN201191407 (Y) discloses a "USB watchdog with remote alarm function" uses "a USB interface" for transferring telephone signal "into serial level, and the main processor, therefore, the USB watchdog with a remote alarm function can realize the remote alarm function on the base of having a watchdog function." (Abstract)

Statement of Need

While the prior art discloses use of RF and alarms using USB devices the only known reference in the pertinent prior art actually concerned with safeguarding against lost of a USB device, US 2009/0015418 A1, "issues a warning" only in response to the elapse of a predetermined period of time after detachment of an associated part.

Since the owner of a USB device typically does not use the device every time for a predetermined period of time two problems with this approach to preventing the USB device "from being left" are discerned: (1) the predetermined period of time before issuance of a warning may be longer than the period of usage, in which case the owner may have left it behind to the mercy of a competitor or other relatively unsympathetic person who may be the sole beneficiary of this 'warning'; and (2) the predetermined period of time may be shorter than the period of usage, in which case the 'warning' will only comprise an annoyance to the owner during use of the USB device.

A need is hence discerned for a means of preventing the loss of a USB device by inadvertently leaving the same functionally connected to a USB port of a computer that is both effective and not annoying during use regardless of the period of time the device is used.

SUMMARY OF THE INVENTION

Objects of the Invention

The encompassing object of the present invention is preventing loss of a USB port connectible device by inadvertently leaving the same functionally connected to a USB port of a computer.

Other objectives of the present invention include ease of operation, economic manufacture and operation, effectiveness and non-annoying operation regardless of the length of time the USB port connectible device is functionally connected to a computer.

Principles in Accordance with the Present Invention

In achievement of the above it is suggested that a USB port connectible device be provided with remote, wireless, signalling capability with an associated portable base, that an alarm be activated by cessation of signal reception and that the signal be transmitted only when the USB port connectible device is connected to a USB port of a powered computer. It is suggested that this wireless remote signalling capability between USB connectible device and an associated portable base be effected with a comparatively weak radio frequency (RF) signal having a limited range of no more than thirty feet, that transmission be powered by the computer to which the USB connectible device is connected, received by the associated portable base and that a DC power source be provided with switching means on the associated portable base. It is suggested that an identification (ID) number be applied to the RF signal in association of a particular USB connectible device with an associated portable base so that reception of other signals of the same RF will not defeat alarm activation while interference with other signals of the same RF be avoided with use of transmission intervals.

The principles in accordance with the present invention require disposition of an alarm generator and RF receiver upon the associated portable base and disposition of an RF transmitter with the USB port connectible device. Use of transceivers for mutual authentication is suggested. A delay in alarm activation: at least twice as long in duration as any transmission interval utilized but no longer than thirty seconds; is suggested following cessation of signal reception to avoid retrieval of the USB connectible device from the computer or momentary blocking of the RF signal from causing alarm activation. The alarm is disposed upon the associated portable base intended to be on the person owning the USB port connectible device so the alarm activated upon cessation of signal reception as result of exceeding the limited range of the RF signal or turning the computer off will remind the owner of the USB connectible device to retrieve the same.

As alarm activation is caused by exceeding signal range it is suggested that switching means be disposed on the portable base for alarm deactivation. Three different switching means are suggested: automatic alarm deactivation only with resumption of signal reception; manual switching; and physical union/separation of USB port connectible device and/or a signalling attachment possessing transmission circuitry to the portable base switching power 'on' with separation from the associated portable base. Manual switching for the alarm only is suggested if physical union/separation switching means for power to all circuitry on the portable base is employed.

It is further suggested that the portable base be physically adapted for ease in carrying and assurance that it remains on one's person with use of a retention device. Lanyard or hand strap, wrist band, badge, clip or belt, with or without reels, are suggested specifically for this purpose. It is suggested that the associated portable base comprise a cap for covering the metal extension of a USB port connectible device that is inserted into a USB port and that the retention device be attached to this cap.

It is noted that an alarm activation delay is readily provided in control circuitry for the alarm with the addition of a clock. An alarm activation delay of approximately ten seconds, within the range of five to fifteen seconds, is specifically suggested. It is also suggested that a signalling attachment attachable to any USB port connectible device be used to house transmission circuitry including RF transmitter and a transmission control circuit rather than adding this transmission circuitry directly to a USB port connectible device. It is suggested that a signalling attachment have a USB port and a USB port connector enabling operation of a USB port connectible device connected to the USB port of the signalling attachment while the USB port connector of the signalling attachment is connected to a USB port of a computer medial to the USB port connectible device and the computer.

It is suggested that a means of indicating low power on the associated portable base be provided and specifically suggested that an alarm generator used to generate an alarm caused by signal reception cessation also be used to provide a low power indication that is readily distinguished from the alarm.

It is finally suggested that the transmission intervals, if used, be furthermore slightly varied in duration to further minimize the possibility that multiple pairs of USB connectible devices and/or signalling attachments and their associated portable bases in accordance with the principles relating to the present invention might interfere with each other. Variation within a range smaller than the transmission interval is suggested. Use of a random number generator for automatic variation of transmission intervals is also suggested. The capability of varying the alarm activation delay, in order only to suit user preference, may also be desirable and a means of selecting from various predetermined delay intervals by the user is suggested.

BRIEF DESCRIPTION OF THE DRAWINGS

FIG. 2 (PRIOR ART) is an isometric view of a simple USB port connectible device with a single USB port connector.

FIG. 3 is a diagram of transmission circuitry for a USB port connectible device reminder in accordance with the principles relating to the present invention.

FIG. 4 is a diagram of reception/alarm circuitry for a USB port connectible device reminder in accordance with the principles relating to the present invention.

FIG. 5 is a bar graph with time the abscissa depicting use of transmission intervals, alarm activation delay, and low power indication.

Figure 1:
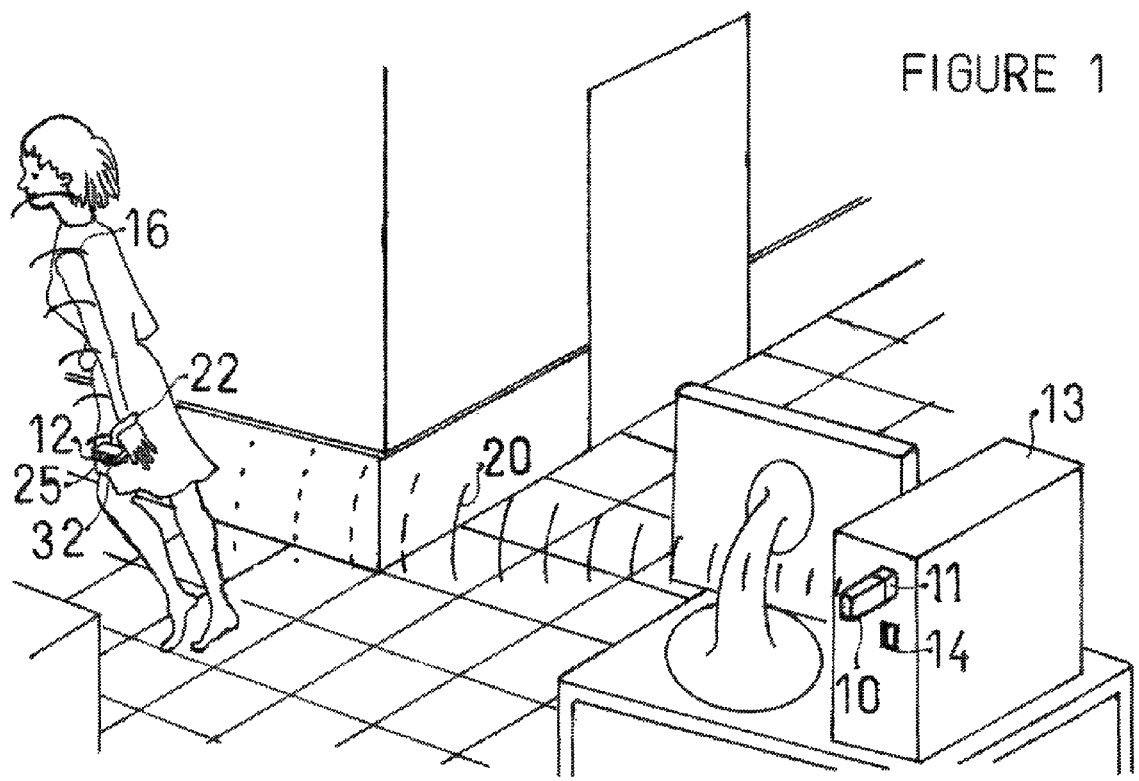
FIG. 1 is an isometric illustration of the operation of a preferred embodiment of the principles relating to the present invention.

| NOMENCLATURE | |
|---|---|
| 10 | USB connectible device |
| 11 | signalling attachment |

-continued

| NOMENCLATURE | |
|---|---|
| 12 | associated portable base |
| 13 | computer |
| 14 | USB port |
| 15 | USB port connector |
| 16 | alarm |
| 17 | transmission control circuit |
| 18 | RF transmitter |
| 19 | RF receiver |
| 20 | RF signal |
| 21 | DC power source |
| 22 | retention device |
| 23 | clock |
| 24 | power switch |
| 25 | manual alarm switch |
| 26 | alarm generator |
| 27 | memory |
| 28 | automatic alarm switch |
| 29 | random number generator |
| 30 | transmission interval |
| 31 | alarm activation delay |
| 32 | manual delay selector |
| 33 | low power indication |
| 34 | reception/alarm control circuit |
| 35 | ID number |
| 36 | reception/alarm circuitry |
| 37 | transmission circuitry |
| 38 | resumption of signal reception |

DETAILED DESCRIPTION OF PREFERRED EMBODIMENT

FIG. 1 depicts the owner of a USB port connectible device 10, with signalling attachment 11, walking away but carrying an associated portable base 12. The owner has left the USB port connectible device 10 with signalling attachment 11 functionally connected to a powered computer 13 through a USB port 14 and mating USB port connector 15, seen in FIG. 2, and is now being reminded of this by an alarm 16 activated by cessation of reception of the RF signal 20: in this case caused by exceeding its limited range; and also caused by turning the computer 13 off. An optional retention device 22 retaining the portable base 12 and comprising, for example, a wrist strap or lanyard as depicted in FIG. 1 encircling a wrist of the owner of the forgotten USB port connectible device 10 helps ensure that the same is not now to be lost.

The signalling attachment 11 transmits and the associated portable base 12 receives an RF signal 20 inclusive of an identification (ID) number 35 seen residing in the reception/alarm control circuit 34 of the reception/alarm circuitry 36 depicted in FIG. 4. This ID number 35 associates a particular portable base 12 with a particular signalling attachment 11 or USB port connectible device 10. The transmission circuitry 37 depicted in FIG. 3 has a transmission control circuit 17 preferably having the ID number 35 in memory 27 so the RF signal 20 produced has this ID number 35 which is recognized by the associated reception/alarm control circuit 34. It is further preferred that this ID number 35 be unique for each associated pair of transmission and reception/alarm control circuits 17, 34 in accordance with the present invention. This preferred use of an ID number 35 ensures that alarm 16 activation is not defeated by reception of another, erroneous signal, of the same frequency. Mutual authentication, requiring transceivers for reception and transmission, can also be added if desired.

The reception/alarm circuitry 36 shown in FIG. 4 also has a power switch 24 that is absent from the transmission circuitry 37: shown in FIG. 3; which is powered by the computer 13 through a USB port connector 15 connected to a USB port 14 as RF signalling capability with an associated portable base 12 is desired only when the USB connectible device 10 being protected from loss is connected to a USB port 14 of a powered computer 13. Turning the computer 13 off activates the alarm 16 reminding the owner of the USB connectible device 10 to retrieve the same prior departure.

The DC power source 21 for the portable base 12 is preferably a battery but a photo-voltaic panel and capacitor is also suggested. Physical union of a USB port connectible device 10 and/or signalling attachment 11 to a portable base 12 preferably opens the power switch 24 depicted in FIG. 4 which is hence preferably closed by physical separation of the signalling attachment 11 and/or USB port connectible device 10 being protected from the portable base 12 as is the case depicted in FIG. 1. An optional automatic alarm switch 28 is also seen in FIG. 4 that is preferably controlled by the reception/alarm control circuit 34 and triggered by the resumption 38 of RF signal 20 reception as seen in FIG. 5. And an optional manual alarm switch 25, seen in FIG. 1, may also be provided for deactivating the alarm 16.

It is suggested that the alarm generator 26 seen in the reception/alarm 36 circuitry depicted in FIG. 4 generate an audio alarm 16 as this is considered most practical for most people but the alarm 16 might be visual or tactile: i.e. vibrating; or any combination of these. It is also noted that an audio alarm generator 26 consumes the least power. It is further suggested that a low power indication 33 be provided and preferred that the alarm generator 26 be used for this and hence preferred that this low power indication 33 be audio as well but readily distinguishable from the alarm 16, as seen in FIG. 5, and preferably pulsed to conserve power.

Use of a clock 23 in both the transmission circuitry 17 shown in FIG. 3 and the reception/alarm circuitry 34 shown in FIG. 4, while optional, is recommended in preferred embodiment of the principles relating to the present invention for two reasons: in the transmission circuitry 17 for transmission intervals 30 depicted in FIG. 5 and in the reception/alarm circuitry 34 for an alarm activation delay 31 also depicted in FIG. 5 in order avoid alarm activation by one or two missed RF signals 20 and to give the owner of the protected USB port connectible device 10 time to retrieve the same from the computer 13 without activating the alarm 16 especially if there are no switching means for the alarm 16 other than the optional automatic alarm switch 28 and the power switch 24 is opened by union of the USB port connectible device 10 and/or signalling attachment 12 with associated portable base 12 and closed with separation.

Transmission intervals 30 for two different RF signals 20 and an alarm activation delay 31 are both depicted in FIG. 5 and are related in that the alarm activation delay 31 necessarily must exceed in duration that of a transmission interval 30 although both are suggested for two separate reasons and depend on clocks 23 that are independent of each other. The purpose of transmission intervals 30 is to avoid interference between RF signals 20 particularly between multiple embodiments of the present invention operating in the same room. Transmission requires only a few milliseconds so a simple, invariant, transmission interval 30 renders the possibility of interference between such embodiments extremely remote. That extremely remote possibility is shown in FIG. 5 for two different RF signals 20 both having transmission intervals 30 of approximately two seconds. Both embodiments, by pure chance, were activated almost simultaneously and unless some variation within a smaller range of time than the transmission interval 30 is utilized: as is shown in FIG. 5; every RF signal 20 between these two embodiments would interfere with each other instead of the single coincidence shown.

It is hence suggested that variation of the transmission interval 30 be effected by the transmission control circuit 17 and further suggested that this variation be random and for this reason a random number generator 29 is seen in the transmission circuitry 37 depicted in FIG. 3. A small time difference is programmed into the transmission control circuit 17 and combined with the random number generated to vary the transmission interval 30 which, for example and as depicted in FIG. 5, varies from 1.75 seconds to 2.25 seconds. The transmission of the RF signal 20 takes but a few milliseconds and random variation of the transmission interval 30 practically ensures that no more than one collision or interference between RF signals 20 between multiple embodiments in proximity with each other will occur. As long as the alarm activation delay 31 is longer than the transmission interval 30 the loss of a single RF signal 20 transmission, caused by momentary blocking of the same, will not activate the alarm 16.

Avoiding interference between RF signals 20 of the same frequency is the inverse of the problem posed by defeating alarm 16 activation with reception of another RF signal 20 which problem is solved by use of an ID number 35 so that another RF signal 20 from another embodiment of the present principles or any other source having the same frequency is not mistaken for the RF signal 20 from the RF transmitter 18 associated with a particular RF receiver 19.

A transmission interval 30 of approximately two seconds duration has been suggested as has an alarm activation delay 31 of approximately ten seconds, which is shown by way of example in FIG. 5. It has been suggested, most importantly with relation to the two, that the duration of the alarm activation delay 31 be longer than the duration of the transmission interval 30 for which a range of one half to three seconds is suggested with a range of five to fifteen seconds for the alarm activation delay 31.

The ability of the operator to vary the alarm activation delay 31 is considered useful if only to suit user preference regarding the same and a manual delay selector 32 shown on the portable base 12 in FIG. 1 is suggested for this purpose. It is suggested that a number of different alarm activation delays 31, none less in duration than the transmission interval 30, be offered by repetitive actuation of a simple manual 'button', as opposed to a rotary dial, for example, mainly for economy and to minimize the surface area on the associated portable base taken up by the manual delay selector 32.

It is also suggested that the manual alarm switch 25 also shown on the associated portable base 12 seen in FIG. 1, if used, operate similarly for the same reasons but with only two states: on and off. This manual alarm switch 25 could also be used to selectively power all the reception/alarm circuitry 34 but it is preferred that it only be used for alarm 16 deactivation, if used at all, as it is preferred that physical union of USB port connectible device 10 and/or signalling attachment 11 with the portable base 12 preferably open the power switch 24 for all the reception/alarm circuitry 34 disposed on the associated portable base 12 and that the automatic alarm switch 28 discussed in detail above be provided for deactivating the alarm 16 with resumption of RF signal 20 reception.

I claim:

1. A USB port connectible device reminder comprising:
   transmission circuitry including a transmission control circuit and a RF transmitter disposed on a USB port connectable device and powered in operation by a computer through a USB port;

reception/alarm circuitry including a reception/alarm control circuit, a RF receiver, and an alarm generator disposed on a portable base for the USB port connectible device, said portable base having a DC power source and a power switch for selectively powering said reception/alarm circuitry;

said RF transmitter transmitting, when powered, an RF signal of limited range receivable by said RF receiver when powered by said DC power source;

said alarm generator generating an alarm, when powered, activated by said reception/alarm control circuit in response to cessation of reception of said RF signal of limited range;

said transmission control circuit possessing memory with an identification (ID) number transmittable by said transmitter such that said RF signal carries said ID number;

said reception/alarm control circuit recognizing said ID number and activating said alarm generator only in response to cessation of reception of said RF signal carrying said ID number;

whereby any of exceeding said limited range of said RF signal carrying said ID number and turning off said computer powering said transmission circuitry results in generation of said alarm.

2. The USB port connectible device reminder of claim 1 wherein said alarm generator also provides low power indication readily distinguished from said alarm.

3. The USB port connectible device reminder of claim 1 wherein said power switch is closed by separation of a signalling attachment possessing said transmission circuitry from said portable base, said signalling attachment being attachable to said USB port connectible device and connectible to a USB port such that said USB port connectible device is functionally connected to a computer and said signalling attachment and said USB port connectible device are both powered by said computer.

4. The USB port connectible device reminder of claim 1 wherein said reception/alarm control circuit automatically switches power to said alarm generator off after resumption of reception of said RF signal carrying said ID number following alarm activation caused by cessation of reception of said RF signal.

5. The USB port connectible device reminder of claim 1 wherein said reception/alarm control circuitry further includes a clock and said alarm generator is only activated after an alarm activation delay to permit retrieval of said USB connectible device from said computer without activating said alarm.

6. The USB port connectible device reminder of claim 1 wherein said transmission circuitry further includes a clock and said transmission control circuit causes intermittent transmission of said RF signal with a transmission interval between signal transmissions.

7. The USB port connectible device reminder of claim 6 wherein said transmission circuitry further possesses a random number generator and said transmission interval is variable about a mean value corresponding to said transmission interval.

\* \* \* \* \*